Jan. 7, 1947.  A. HERST  2,413,827
RAKE
Filed May 31, 1944

INVENTOR.
ABRAHAM HERST.
BY
A. Schapp
ATTORNEY.

Patented Jan. 7, 1947

2,413,827

UNITED STATES PATENT OFFICE 2,413,827

RAKE

Abraham Herst, Oakland, Calif.

Application May 31, 1944, Serial No. 538,130

1 Claim. (Cl. 56—400.17)

The present invention relates to improvements in rakes and a method for making the same, and has particular reference to a garden tool commonly known as a lawn rake.

Rakes of this type are usually made of bamboo, with a plurality of tines arranged in fan-shaped relation, so as to come to a common center which is anchored to a handle by means of a clamp, a wire, a bolt, a nail or otherwise.

A cross-member is usually fastened upon the tines at a certain distance from the center and serves as further anchoring means for the handle, and flexible means, such as wires or cords, are intertwined with the tines in progressively spaced relation from the center to properly position the tines.

It is proposed in the present invention to provide a lawn rake, preferably made of bamboo, that readily lends itself to mass producton methods, can be manufactured at low cost, eliminated the entwined wires or cords, avoids splitting of the bamboo, firmly holds the tines in their respective positions, and yields a better product capable of resisting wear for a long time period.

Further objects and advantages of my invention will appear as the specification proceeds, and the novel features of my invention will be fully defined in the claim hereto appended.

Figure 1:
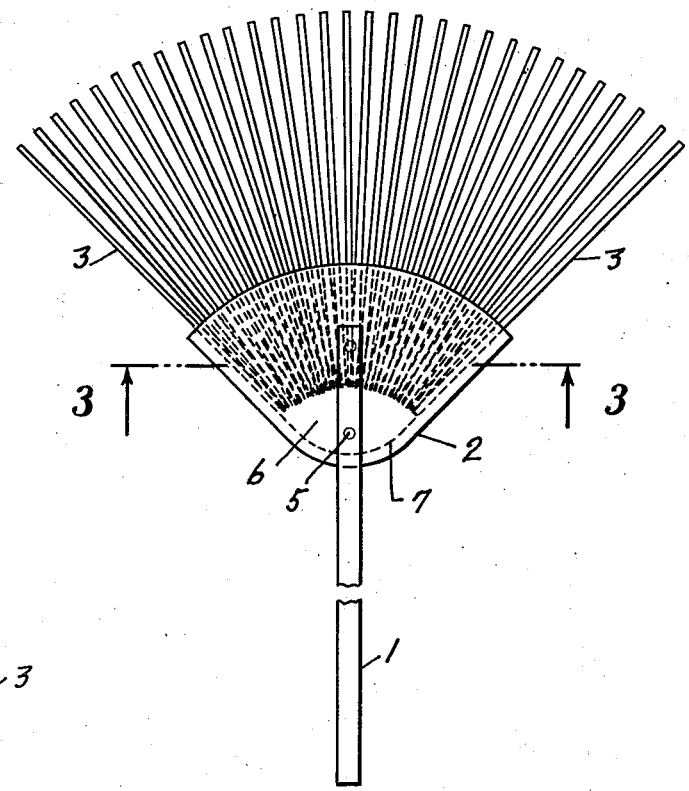
Figure 2:
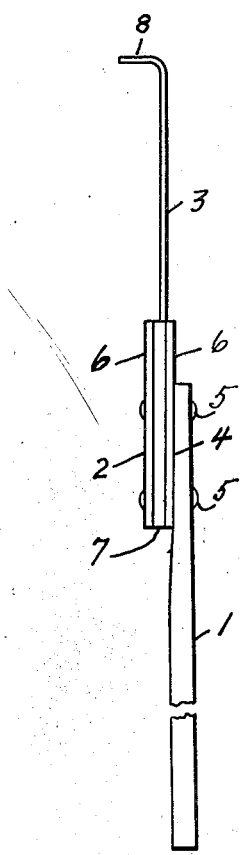

The preferred form of my inventon is illustrated in the accompanying drawing forming part of this application, in which:

Figure 1 shows a plan view of my rake;

Figure 2, an edge view of the same; and

Figure 3:
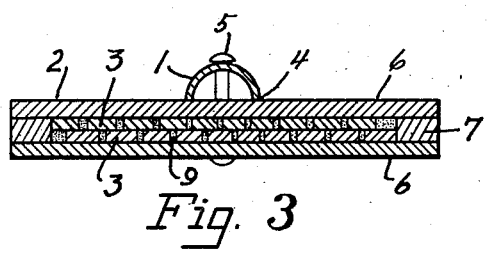

Figure 3, a transverse section taken along line 3—3 of Figure 1.

While I have shown only the preferred form of my invention, I wish to have it understood that various changes or modifications may be made within the scope of the claim hereto attached, without departing from the spirit of the invention.

Referring to the drawing in detail, my rake comprises in its principal parts a handle 1, a frame 2 and a plurality of tines 3.

The handle 1 may be of any suitable construction, and is preferably made of bamboo, as in the conventional type of lawn rake, its attaching end being cut down, as at 4, to form a flat seat adapted for resting upon the frame and for attachment thereto by means of bolts or rivets 5.

The frame 2 is preferably made of wood, and may consist of two sector-shaped boards 6 disposed in registering relation and separated by means of a border strip 7 running alongside the radial edges thereof.

The boards may be fastened upon the border strip in any suitable manner, as by glue, nails, staples or otherwise.

The frame thus forms a flat pocket closed along the radial edges of the frame and open along its circumferential edge.

The tines 3 may be made in any suitable form and of any practical material. They are preferably bent at their outer ends, as at 8, and are arranged in the conventional fan-shaped relation and have their inner ends accommodated in the pocket of the frame. The inner ends may extend into the frame to any suitable depth, and are preferably brought down sufficiently deep to have their extreme inner ends overlap as shown in the sectional view of Figure 3.

The inner ends of the tines are anchored in the frame pocket by means of pitch 9 or other suitable adhesive. The pitch is applied in heated condition so as to pour freely, to completely fill the entire pocket space and to firmly anchor the tines to one another and to the walls of the pocket upon cooling.

The border strip 7 is preferably made of a thickness exceeding that of the tines so that there is ample room available within the pocket for the overlapping of the inner ends of the tines and for the pouring of the pitch from the pocket opening.

The frame is preferably made of wood, but may be made of any suitable material, such as metal or plastic.

The tines are preferably made of bamboo, in the conventional manner, but may be made of metal fibre, plastic, wood pulp, other woods, or any other suitable material.

In the present instance, the tines are shown as overlapping at the inner ends to insure a firm anchor in the adhesive, but it is apparent that any other means may be employed to intensify the grip of the adhesive on the inner ends of the tines, depending somewhat on the material used.

The manufacture of this rake is extremely simple and readily lends itself to mass production. The manufacture of the frame offers no problem. The tines may be assembled in their typical fan-wise relation in any suitable jig whereupon the narrow end of the fan-assembly may be lowered as a unit into the pocket. The pouring of the pitch then completes the operation. The handle may be applied in any suitable manner.

My rake is more compact and attractive. The tines are spaced uniformly and are firmly anchored in their respective places. There is no chance for lateral shifting of the individual tines, and the spacing will remain the same throughout the life of the rake.

There is no necessity of driving any nails through the bamboo, nor for winding threads or wire through the tines for holding the latter in the proper relation.

My invention is easy to manufacture by American methods, simple and sturdy in construction, and attractive in appearance.

I claim:

A rake of the class described comprising a fan-shaped frame composed of two flat spaced sides having an arcuate edge and two angularly disposed edges, and a body wall connecting the angularly disposed edges of the sides to form a cavity, a plurality of bamboo tines arranged in spaced fan-wise relation and having their inner end portions arranged within said cavity and terminating short of the apex thereof, cementitious material filling the interstices between the tines, and the space between the tines and the walls of the cavity, and a handle secured to the frame exteriorly thereof.

ABRAHAM HERST.